Patented Jan. 14, 1947

UNITED STATES PATENT OFFICE 2,414,360

MANUFACTURE OF WATER-RESISTANT LAMINATED ARTICLES

John D. Carter, Lansdowne, Pa., assignor to Philadelphia Quartz Company, Philadelphia, Pa., a corporation of Pennsylvania No Drawing. Application August 1, 1941, Serial No. 405,119

13 Claims. (Cl. 154—40)

This invention relates to manufacture of water-resistant laminated articles; and it comprises a process of making substantially water-proof laminated paper board, corrugated paper and similar articles, in which plies of porous material, such as paper are united with silicate adhesives, said process comprising the step of impregnating the porous material, where it comes in contact with said silicate adhesive, with aluminum chloride in proportions sufficient to insolubilize the adhesive bond, said proportions being usually also sufficient to prevent desizing of the plies by alkali derived from said adhesive, said impregnating step being followed by combining the plies with the use of a silicate adhesive in the usual manner. The invention also includes the water-resistant articles made by the process described, these articles being composed of plies of fibrous material united with a bond comprising the reaction products formed in situ of a silicate adhesive and aluminum chloride; all as more fully hereinafter set forth and as claimed.

In making laminated paper board and other laminated articles with the use of silicate of soda adhesives, difficulties arise in some cases owing to the alkali derived from these adhesives. If the plies are sized with sizing agents subject to attack by alkali to make them water resistant, any alkali derived from the adhesive tends to produce desizing as well as staining. And it is also true that, in the case of certain unusually severe conditions of use, such as are met in the shipment of wet vegetables and the export shipment of canned goods which are expected to be exposed to the weather for extended periods of time, the bond produced by the usual silicate adhesives is not satisfactorily water-proof.

Specifications have recently been drawn up for cases in export shipment in which it is required that test pieces of combined board 0.1 inch thick, having dimensions of 10" by 6" shall absorb no more than 50 per cent by weight of water upon immersion in water at a temperature of 80° F. for a period of two hours, the Mullen test after immersion being not less than 200 when measured 2 inches from the edge. Any separation of plies caused during an immersion of 1 hour must not exceed 2 inches at any point. Combined board made with the usual silicate adhesive is not usually able to pass such rigid requirements. The production of insoluble silicate bonds capable of withstanding water-immersion tests for all types of service has, of course, long been a desideratum in the art.

The problem of preventing desizing by the alkali derived from silicate adhesives has been solved with satisfaction by methods which are described in my two prior patents, Numbers 2,015,359 and 2,231,562. In the former patent it is recommended that the plies to be united be treated on either surface with heavy metal or alkaline earth metal salts in order to prevent the migration of alkali through the plies and the consequent staining of the facing sheets, while in the later patent the use of ammonium salts is recommended for the same purpose. But the salts listed in these patents, when applied in the manner disclosed, have insufficient effect upon the water solubility of the silicate bonds; hence articles made in accordance with the directions given in these patents tend to fail in the above tests owing to the separation of the plies on immersion.

I have now found that, if the faces of the plies to be united are impregnated with aluminum chloride prior to combining them, not only is desizing prevented but also separation of the plies on immersion is substantially prevented. The silicate bonds produced are substantially insoluble in water. In a large number of tests which were designed to find other salts which might produce the same results, none was found which was capable of producing results as satisfactory as those produced by aluminum chloride. This salt is apparently unique in this respect. Surprisingly neither aluminum sulfate nor aluminum nitrate is effective, which indicates that the effect is not specific to the aluminum ion. And magnesium and zinc chlorides, while producing a slight water-insolubilizing effect on the adhesive bond, are not comparable in effect to aluminum chloride, which indicates that this effect is also not specific to the chloride ion. Ammonium salts were found to produce no substantial insolubilizing effect on the silicate bond in spite of the fact that these salts afford adequate protection against desizing. There appears to be no direct relationship between these two effects.

In comparison with the specifications given above, in which the adhesive bond is required to withstand immersion for 1 hour without producing a separation of the plies greater than 2 inches, I have found that compound paper board made with my new water insoluble bond will withstand immersion for periods up to four weeks or longer which, needless to say, is a highly surprising result. Test pieces produced under optimum conditions of impregnation were found to have their bonds substantially unimpaired after four or six weeks immersion in water, followed by drying.

Attempts were made to determine whether it is necessary to employ any specific ratio between the silicate adhesive and the aluminum chloride impregnant to produce water-resistant bonds. It is obviously impossible to determine just how much of the aluminum chloride used to impregnate the plies remains on the surface to react with the silicate of the adhesive. This renders difficult a theoretical determination of the best proportions of aluminum chloride and silicate to produce an insoluble bond. The best proportion in a given case depends, of course, upon the porosity of the paper, since a porous paper requires a larger application of aluminum chloride to produce a given concentration at its surface. I have found, however, that for heavily sized, and therefore substantially non-porous papers, best results have been obtained when the ratio between the aluminum chloride and the silicate in the joint, expressed in molecular proportions, falls within the range of about $1AlCl_3:3SiO_2$ to $1AlCl_3:10SiO_2$. The range over which improved results are obtained for papers in general extends from about $1AlCl_3:1SiO_2$ to $1AlCl_3:20SiO_2$. An excess of $AlCl_3$ over that represented by the ratio of about $1AlCl_3:2SiO_2$ is not detrimental but it does not appear to increase the insolubility of the bond appreciably. These figures include the aluminum chloride applied to the adjacent faces of both plies forming the joint.

It is relatively easier to determine the best proportions of aluminum chloride to prevent desizing in the case of plies which are sized with sizing agents subject to attack by alkalis. I have found that, for complete protection against desizing, it is necessary that the chloride ion of the aluminum chloride be approximately equivalent to or slightly in excess of the sodium ion of the adhesive present in the joint. The protection against desizing falls off rather rapidly when the ratio of the chloride ion of the sodium ion falls below a ratio of about 1Cl to 1Na, although some protection is obtained at ratios as low as 1Cl to 2.5 $Na_2O$. An excess of aluminum chloride does no harm but, when the ratio exceeds about 2Cl to 1Na, no improvement in the protection is observable. Since the prevention of desizing is of great importance in the production of a water-resistant article, I prefer to employ the aluminum chloride and silicate in proportions such that the best desizing action is obtained.

Although I believe it best to use aluminum chloride per se in the process of the present invention, I have found that substantially the same results are produced by the use of mixtures of chemicals capable of forming aluminum chloride in solution. Thus, it is possible to mix aluminum sulfate and other soluble aluminum salts with water soluble chlorides, such as ammonium chloride, sodium chloride, magnesium chloride etc. It is believed that the active agent in these mixtures is the aluminum chloride which is formed by chemical reaction. This procedure, therefore, represents an alternative embodiment of this invention.

It is possible to add various addition agents to the aluminum chloride impregnating solutions which are adapted to accomplish certain special results. For example it is possible to add corrosion inhibitors, such as dichromates or aniline oil. Any other agents which are compatible with the aluminum chloride can be incorporated. It is also possible to employ separately applied agents to prevent desizing in connection with my process. It is possible, for example, to apply a solution of an ammonium salt to the outer faces of a laminated article while applying aluminum chloride to the ply faces which are bonded.

The aluminum chloride is advantageously applied to the plies in the form of an aqueous solution but any other method adapted to impregnate uniformly the surface layers of the plies is equally effective. Thus, it is possible to employ solutions of aluminum chloride in organic solvents, such as carbon tetrachloride, for example. Solutions of aluminum chloride can be applied to the finished plies by brushing or spraying operation, or it may be applied by means of transfer rolls of the type used for applying adhesives in machines for the continuous manufacture of corrugated or combined paper board. It is more convenient, however, to apply the aluminum chloride during the paper making process, for example by means of the calender rolls of the paper machine, in a manner analogous to that used in producing the water-finishing of paper.

The concentration of the aluminum chloride solution to be employed depends, of course, upon the method of application. Other factors being equal, it is usually advantageous to employ solutions which are concentrated and nearly saturated for the reason that there is then less water to eliminate in later operations. When an aqueous solution is applied on the calender rolls of a paper making machine, a concentration ranging from about 10 to 50 per cent can be employed, for example.

In a specific example of the present invention, which represented a practical embodiment, an aluminum chloride solution was used which contained 162 pounds $AlCl_3 \cdot 6H_2O$ and 0.16 pound sodium dichromate per 35 gallons of solution. This solution was applied to both faces of chip stock on the calender rolls of a paper making machine, the average application amounting to 1.08 pounds of $AlCl_3 \cdot 6H_2O$ per 1000 square feet. The back faces of two jute liners were also treated with an aluminum chloride solution in similar manner, the average application amounting to 0.476 pound per 1000 square feet. These treated plies were combined into a solid board having a thickness of 0.1 inch, using a silicate adhesive containing 9.1 per cent $Na_2O$ and 29.9 per cent $SiO_2$.

The finished board thus produced was tested for water resistance in comparison with uncombined liner and chip stock as well as against untreated combined board. It was found that, after 2½ hours immersion in water, the uncombined, untreated chip stock showed a water pick-up of 35.5 per cent, while the uncombined, untreated liners gave a water pick-up of 43 per cent. The untreated combined board gave a water pick-up of 56.8 per cent whereas the treated combined board gave a water pick-up of only 38.5 per cent, which is substantially equal to that of the uncombined, untreated stock, showing that the effect of the silicate adhesive in causing increased water pick-up had been substantially eliminated by the aluminum chloride treatment. After the 2½ hours immersion, the Mullen test on the treated board gave a value of 247 pounds, as compared with 223 pounds for the untreated board.

In a second specific example, operated on a smaller scale, a solution of aluminum chloride, containing 2 parts by weight of the crystallized salt to 10 parts of water, was applied to plies of paper stock well-sized with rosin. After the solution had dried, the plies were combined by means of a sodium silicate solution, testing approximately 40.5° Bé., and containing about 8.9% $Na_2O$ and 28.5% $SiO_2$. After air-drying, test samples of the combined board were placed in water, at room temperature. After soaking for 4 weeks and drying, the bond was still good. The samples showed no desizing by alkali from the adhesive.

In a third specific example, plies of a paper stock well-sized with rosin were treated on one side with a solution of aluminum chloride comprising 2 parts of crystallized aluminum sulfate and 1 part of sodium chloride to 10 parts of water. These plies were combined with the use of an adhesive made from a silicate solution containing about 8.9% $Na_2O$ and 28.5% $SiO_2$, which solution was diluted to a gravity of 34° Bé. and then mixed with hydrous clay in the proportion of about 100 parts of the diluted solution to 30 parts of the clay. Test samples of the combined board showed complete protection against desizing by alkali from the adhesive and, when immersed in water for 18 hours, showed no weakening of the bond.

While I have described what I consider to be the best embodiments of my invention, it is evident, of course, that many modifications can be made in the specific procedures which have been mentioned without departing from the purview of this invention. My invention is broadly applicable to the uniting of porous materials of all types by means of alkali metal silicate adhesives in general. It may be used in making ply-wood, for example, with silicate adhesives and corrugated as well as solid articles. Any of the conventional silicate adhesives can be employed in my invention with the resultant formation of substantially insoluble bonds. Further modifications which fall within the scope of the following claims will be immediately evident to those skilled in this art.

What I claim is:

1. In the manufacture of laminated products from plies of porous material, the process which comprises impregnating the faces of the plies to be joined with a small amount of aluminum chloride, applying a silicate adhesive and combining the plies whereby a substantially insoluble silicate bond is produced.

2. In the manufacture of laminated products from plies of porous material, the process which comprises applying to the faces of the plies to be joined a small amount of a concentrated solution containing aluminum chloride, drying and then uniting the plies with the aid of a silicate adhesive the bonding agent in which consists substantially of an alkali metal silicate, whereby a substantially insoluble silicate bond is produced.

3. The process of claim 2 wherein said aluminum chloride solution contains a corrosion inhibitor compatible with the aluminum chloride.

4. The process of claim 2 wherein said aluminum chloride solution is formed by mixing aluminum sulfate with a soluble chloride, whereby the aluminum chloride is formed by double decomposition.

5. In the manufacture of laminated products from plies of porous material, the process which comprises applying to the faces of the plies to be united a concentrated aqueous solution of aluminum chloride, drying and combining the plies with the aid of a silicate adhesive the bonding agent in which consists substantially of an alkali metal silicate, the aluminum chloride being employed in such quantity, relative to the silica of said adhesive in the joint, to produce a molecular ratio ranging from about $1AlCl_3:1SiO_2$ to $1AlCl_3:20SiO_2$.

6. In the manufacture of laminated products from plies of porous material, the process which comprises applying to the faces of the plies to be united a concentrated aqueous solution of aluminum chloride, drying and combining the plies with the aid of a sodium silicate adhesive the bonding agent in which consists substantially of sodium silicate, the aluminum chloride being employed at least in sufficient quantity, relative to the $Na_2O$ in the adhesive in the joint, to produce a molecular ratio of about $1.1Cl$ to $1Na_2O$.

7. A laminated article formed of plies of porous material united by a substantially insoluble silicate bond comprising the reaction products of an alkali metal silicate and aluminum chloride, said reaction products being formed in situ.

8. A laminated article formed of plies of a porous material united by a substantially insoluble silicate bond comprising the reaction products of an alkali metal silicate, aluminum sulfate and a soluble chloride, said reaction products being formed in situ.

9. A laminated article formed of plies of fibrous material sized with a sizing agent subject to attack by alkali and united by a substantially insoluble silicate bond comprising the reaction products formed in situ of an alkali metal silicate adhesive, in which the bonding agent consists substantially of an alkali metal silicate, and aluminum chloride, said article being substantially proof against desizing caused by alkali derived from said alkali metal silicate.

10. A laminated article formed of parts of porous material sized with a sizing agent subject to attack by alkali and united by a substantially insoluble silicate bond comprising the reaction products formed in situ of an alkali metal silicate adhesive, in which the bonding agent consists substantially of an alkali metal silicate, and aluminum chloride, the molecular ratio of $AlCl_3$ to $SiO_2$ in said bond ranging from about 1:1 to 1:6, said article being substantially proof against desizing caused by alkali derived from said alkali metal adhesive.

11. A laminated article formed of plies of fibrous material sized with a sizing agent subject to attack by alkali and united by a substantially insoluble silicate bond comprising the reaction products formed in situ of a silicate adhesive, in which the bonding agent consists substantially of sodium silicate, and aluminum chloride, the molecular ratio of Cl to $Na_2O$ in said bond being at least about 1.1 to 1, said article being substantially proof against desizing caused by alkali derived from said alkali metal adhesive.

12. A combined paper board formed of paper plies sized with a sizing agent subject to attack by alkali and combined by a silicate adhesive bond, said bond comprising the reaction products formed in situ of a silicate adhesive, in which the bonding agent consists substantially of sodium silicate, and aluminum chloride, said reaction products rendering said board water resistant as well as proof against desizing caused from the alkali of said adhesive.

13. A combined paper board formed of paper plies sized with a sizing agent subject to attack by alkali and combined by a silicate adhesive bond, said bond comprising the reaction residues formed in situ of a silicate adhesive, in which the bonding agent consists substantially of sodium silicate, aluminum sulfate and a soluble chloride, said reaction products making said bond substantially insoluble and rendering said board substantially proof against desizing caused from the alkali of said adhesives.

JOHN D. CARTER.